(12) United States Patent
Che

(10) Patent No.: US 12,092,210 B2
(45) Date of Patent: *Sep. 17, 2024

(54) HYDRAULIC PRESSURE POWER BATTERY

(71) Applicant: Yanjun Che, Niagara Falls (CA)

(72) Inventor: Yanjun Che, Niagara Falls (CA)

( * ) Notice: Subject to any disclaimer, the term of this patent is extended or adjusted under 35 U.S.C. 154(b) by 64 days.

This patent is subject to a terminal disclaimer.

(21) Appl. No.: 18/082,096

(22) Filed: Dec. 15, 2022

(65) Prior Publication Data

US 2023/0250874 A1    Aug. 10, 2023

Related U.S. Application Data

(63) Continuation of application No. 15/794,789, filed on Oct. 26, 2017, now Pat. No. 11,608,888.

(51) Int. Cl.
| | |
|---|---|
| *F03B 9/00* | (2006.01) |
| *F03B 11/00* | (2006.01) |
| *F03B 13/14* | (2006.01) |
| *F03B 13/24* | (2006.01) |
| *F03B 17/04* | (2006.01) |
| *F16H 61/4017* | (2010.01) |
| *F16H 61/4174* | (2010.01) |
| *F16H 61/475* | (2010.01) |

(52) U.S. Cl.
CPC ........... *F16H 61/4017* (2013.01); *F03B 9/00* (2013.01); *F03B 11/002* (2013.01); *F03B 11/006* (2013.01); *F03B 13/148* (2013.01); *F03B 13/24* (2013.01); *F03B 17/04* (2013.01); *F16H 61/4174* (2013.01); *F16H 61/475* (2013.01)

(58) Field of Classification Search
CPC .... F03B 11/002; F03B 11/006; F03B 13/148; F03B 13/24; F03B 17/04; F16H 61/4017; F16H 61/4174; F16H 61/475
See application file for complete search history.

(56) References Cited

U.S. PATENT DOCUMENTS

| | | | | |
|---|---|---|---|---|
| 3,857,242 A | * | 12/1974 | Gilmore | F03B 17/04 60/495 |
| 3,934,964 A | * | 1/1976 | Diamond | F03B 17/04 74/DIG. 9 |
| 4,742,242 A | * | 5/1988 | De Shon | F03B 17/02 290/1 R |
| 4,981,015 A | * | 1/1991 | Simpson | F03B 17/02 60/495 |
| 5,944,480 A | * | 8/1999 | Forrest | F03B 17/04 415/6 |
| 6,579,638 B2 | * | 6/2003 | Brassard | H01M 8/186 429/422 |
| 6,734,574 B2 | * | 5/2004 | Shin | F03B 17/04 310/152 |
| 6,817,180 B2 | * | 11/2004 | Newman | F03B 17/025 417/329 |

(Continued)

*Primary Examiner* — Tulsidas C Patel
*Assistant Examiner* — Thomas K Quigley

(57) ABSTRACT

A method for driving a transmission mechanism output power in response to an anticipated fluid-pressure gradient field is provided. The method includes sensing the change of direction of pressure gradient field at a desired location from the different area of the transmission mechanism within fluid. The method further includes constructing fluid-pressure gradient field based upon isolation-fluid apparatus or low-density fluid space installed on a transmission mechanism within fluid.

1 Claim, 13 Drawing Sheets

(56) References Cited

U.S. PATENT DOCUMENTS

| | | | | |
|---|---|---|---|---|
| 7,637,104 B2* | 12/2009 | Lopez | ............. | F04B 35/00 |
| | | | | 60/495 |
| 2006/0272327 A1* | 12/2006 | Souris | ............. | F03B 17/02 |
| | | | | 60/504 |
| 2010/0276934 A1* | 11/2010 | Francis | ............. | F03B 17/06 |
| | | | | 290/53 |
| 2013/0168970 A1* | 7/2013 | Grossman | ............. | F03B 17/04 |
| | | | | 290/1 A |
| 2014/0197642 A1* | 7/2014 | Daya | ............. | H02K 53/00 |
| | | | | 74/DIG. 9 |
| 2014/0217734 A1* | 8/2014 | Peng | ............. | F03B 13/1815 |
| | | | | 74/DIG. 9 |
| 2015/0020518 A1* | 1/2015 | Manoj | ............. | F03B 17/02 |
| | | | | 60/495 |
| 2016/0146179 A1* | 5/2016 | Che | ............. | F03B 15/06 |
| | | | | 74/DIG. 9 |

\* cited by examiner

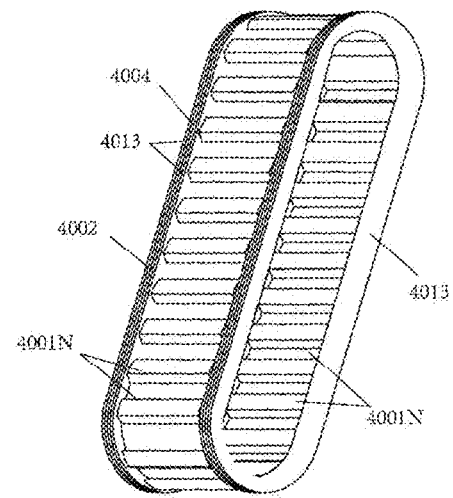
FIG.4A1
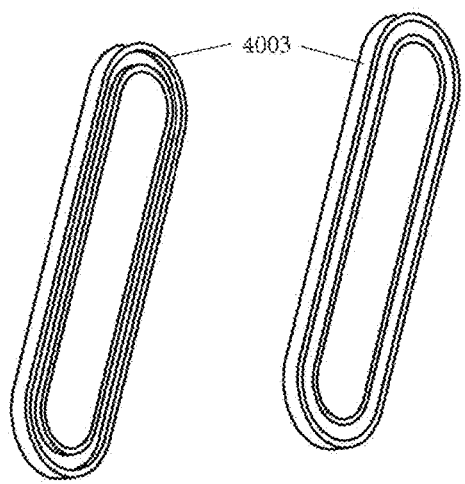
FIG.4A2

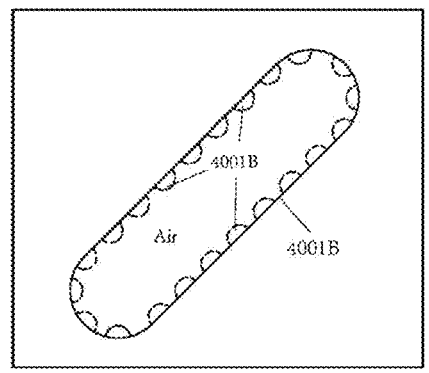
FIG.4C1
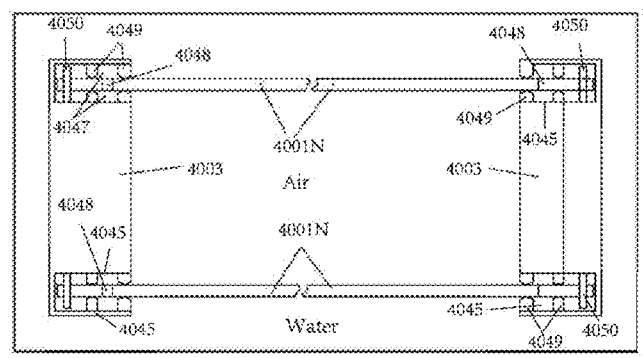
FIG.4C2

HYDRAULIC PRESSURE POWER BATTERY

CROSS-REFERENCE TO RELATED APPLICATIONS

This application is a Continuation Application of U.S. Ser. No. 15/794,789 filed Oct. 26, 2017. The subject matter of each of the above-referenced applications is incorporated in entirety by reference.

TECHNICAL BACKGROUND

The present disclosure relates to an energy conversion device, and in particular relates to a hydraulic pressure power battery. The battery may, for example, be useful in applications to provide energy source at anywhere on the earth.

The extraction of energy from the flow of water is not the best way to use water, because it only uses the gravitational potential energy of the water, and the interior pressure energy of the water is not utilized and therefore wasted. Similarly, for a mobile unit, water resources without dropping and marine resources, the gravitational energy is not being utilized.

There are some methods to obtain energy in a static liquid, which depends on creating a difference in buoyancy by changing the volume of the object so as to drive the rotation of the object by using the rotating mechanism. However, the process of changing the volume of the object can consume energy. As a result, the goal to obtain energy can be deviated from the target.

In recent years, with the rapid economic development and the necessities to reduce emissions, there are more and more needs for renewable energy, especially as a mobile electronic products and transportation power demand.

SUMMARY OF THE PRESENT DISCLOSURE

In the present disclosure, the fluid pressure field pattern can be applied to the upper and lower surface of the oblique objects, thus forming a fluid pressure gradient field for extracting the fluid energy. In the present disclosure, the kinetic energy from the high-pressure region of the fluid to the low-pressure region flow pattern can be extracted as a form of the fluid energy. Fluid contains long-lasting static potential energy, and the potential energy can be stored as "power" in the rechargeable batteries, while the hydraulic pressure power battery equipment stores long-lasting static potential energy. A hydraulic pressure power battery equipment as an energy conversion device can be a power source in any device, or output power through a generator. The hydrostatic pressure can also be classified into two different pressures based on the directions of the downward liquid column pressure and the direction of upward buoyancy by putting an object into the fluid. Typically, using the techniques described below, by using fluid gravity and buoyancy as exterior forces, a unidirectional and asymmetrical force is applied to the rotating body to generate an exterior torque to achieve the purpose of pushing the rotation of the rotating body. In one embodiment, for the fluid, the movement of objects in general can only be moved in a single direction. In one embodiment, Typically, using the techniques described below, objects can move up and down repeatedly by utilizing fluid pressure gradient field, wherein the objects do not consume energy and do not change its the shape, volume, and density. The fluid pressure gradient field includes gravitational gradient field and buoyancy gradient field. In some embodiments, using the techniques described below, a timeless and asymmetric pressure environment can be generated by utilizing the pressure potential energy, gravity and buoyancy of the fluid. The potential energy can be converted to mechanical energy. Various embodiments therefore have a variety of possible applications including for example, as the power source of the generator that can be placed at the factory, a house and so on, and also can be as a power source to provide high-capacity and long-lasting energy for the vehicle, robot, implantable medical devices and mobile electronics.

In some embodiments, the fluid gradient pressure field model is the so-called fluid gravity gradient field and buoyancy gradient field. For the liquid pressure, the pressure increases as liquid depth increase. When an air space is placed in the liquid, the air space can alter the natural distribution of pressure gradient. Dynamic sealing technology is used between air and liquid for isolation. There are various methods to have dynamic seals. The seals can be a ferrofluid seal, mechanical seal, or a combination of mechanical seals and the ferrofluid seal. The so-called ferrofluid seal is to use ferrofluid to shield the fluid for building environment of air, and a vacuum environment that includes the shielding structure in the fluid. The ferrofluid has both the liquidity of ferrofluid and a solid magnetic material with magnetic. The fluid has no magnetic attraction at the time of static state, but when the exterior magnetic field is applied; it is shown that the fluid is magnetic. For magnetic shield, the solid energy of the magnet can be in a specific position with the ferrofluid to form a magnetic loop against the pressure of the fluid. Meanwhile, the ferrofluid has zero friction, and has no leakage characteristics without obstructing the rotation of the rotating object. Therefore, a non-symmetric fluid pressure is applied to the rotating body, and a cycle of gravity difference is obtained according to the principle of gravity balance, which is important for the extraction of energy from the fluid pressure. The example method of hydraulic pressure power battery equipment can include one or more of the following features. The hydraulic pressure power battery equipment can include one or more of the following features.

In one aspect, a hydraulic pressure power battery is disclosed, which includes a first shielding device located at the lower of one side of the rotating structure, a second shielding device located at the upper of other side of the rotating structure, and the first shielding device and the second shielding device are dynamically sealed and connected to the rotating structure for shielding the upper and lower parts of the fluid; and the first and second shielding devices are respectively fixed with container to eliminate upper and lower fluid pressures locally applied to the rotating structure for constructing the fluid gravity gradient field and the buoyancy gradient field; And applying a gravitational gradient field and a buoyancy gradient field on the rotating structure to apply an asymmetric fluid rotational torque for driving the rotating structure to rotate and delivering the generated kinetic energy to the transmission shaft output.

In one aspect, also a hydraulic pressure power battery equipment is disclosed, which includes: a first fluid chamber located at below the rotating structure, and a second fluid chamber located at the upper of the other side of rotating structure, so that an asymmetric fluid pressure is applied to the rotating structure; disposing the first air chamber above the first fluid chamber and the second air chamber under the second fluid chamber to have the buoyancy gradient field and the gravity gradient field in order to allow the rotating structure to obtain a downward direction of pressure difference (liquid column pressure) and upward direction of pressure difference (buoyancy), so that an asymmetric fluid rotation torque is generated for driving the rotating structure to rotate and delivering the generated kinetic energy to the transmission shaft output.

In one aspect, also a hydraulic pressure power battery is disclosed, which includes: a shield cover, located on one side of the rotating body, the rotating body is divided into A, B two parts; and the shield cover is dynamically sealed and connected to the rotating body for shielding the fluid, so that the fluid in the part A of the rotating body has no gravity force, and the Part B has buoyancy force; the gravity inside part A and buoyancy inside part B are used to generate an asymmetric fluid rotation torque for driving the rotating body to rotate and delivering the generated kinetic energy to the transmission shaft output.

In one aspect, also a hydraulic pressure power battery is disclosed, which includes a first shielding structure located at one side of end face of conveyor belt and a second shielding structure located at the other side of end face of the conveyor belt. The first shielding structure and the second shielding structure are dynamically sealed and connected to the conveyor belt for shielding the fluid; an air space or a low pressure fluid space is formed by the shielding structure and conveyor belt. The fluid is divided into two parts: the pressure of liquid column and the buoyancy force. The gravitational gradient field and buoyancy gradient field are constructed; the use of liquid pressure and buoyancy on the conveyor belt to apply the up and down exterior force, resulting in an asymmetric fluid rotation torque that can be used to push the conveyor belt rotation, and the resulting kinetic energy is delivered to the transmission shaft output.

In one aspect, also a hydraulic pressure power battery is disclosed, which includes an inclined transmission belt, which can be slid along the pulley and have more than one object fixed to the conveyor belt; the shielding structure being located at the lower one side of the conveyor belt is dynamically sealed and is in contact with the conveyor belt to shield the fluid; shielding structure is connected with the conveyor belt, so that the local conveyor belt will affect by liquid column pressure; and shielding structure is fixed to the container in order to counteract the effects of buoyancy on it. The gravitational gradient field is constructed so that the liquid column pressure and the buoyancy force exert an asymmetric exterior force on two sides of the conveyor belt to produce an asymmetric fluid rotation torque for driving the rotation of the rotating structure and delivering the generated kinetic energy to the transmission shaft output.

In some embodiments, the described rotating structure can be a cylindrical, annular or conveyor belt. In some embodiments, the fan angle of the described shielding device is not fewer than 90 degrees. In some embodiments, the shape of the described conveyor belt can be a synchronous belt. In some embodiments, the described equipment includes at least one of the described shielding devices below the rotating structure hypotenuse. In some embodiments, the magnetic circuit of the shielding device may be provided with permanent magnets in the interior of the rotating structure or the surface being magnetic permeability, while the magnetic chamber is fixed at positions where the permanent magnets are opposed to each other. In some embodiments, the shielding device comprises the described rotating structure. In some embodiments, between the described shielding device and the described rotating structure is air or a vacuum. In some embodiments, the described shielding device can be a combination of a plurality of sealing forms.

In some embodiments, the fluid chamber of the hydraulic pressure power battery includes a shielding structure, a container and a rotating structure. In some embodiments, the described equipment is equipped with at least one fluid chamber to extract energy. In some embodiments, the shielding structure of the described fluid chamber can be a combination of ferrofluid and other sealing forms. In some embodiments, the surface of the rotating structure can be convex or concave to increase the area of action and the force of the fluid.

In some embodiments, the dynamic seal between the described shield cover and the described rotating mechanism can be in the form of a ferrofluid or other seal. It should be understood, in some embodiments, when the described rotating body is located inside the described shield cover, the gravity is constant. In some embodiments, the described shield cover can be equipped with fluid inside, but no fluid outside the shield cover, and there is an eternal pressure in the rotating body.

In some embodiments, the described conveyor belt is configured in a polygonal configuration or in an inclined, fixed ring shape. In some embodiments, the described shielding structure is configured as a rail structure. In some embodiments, the described equipment includes, between the described conveyor belt and the described rail structure, a dynamic seal, a ferrofluid seal or a combination with a mechanical seal. In some embodiments, the surface of the described conveyor belt can be the concave or convex shape to increase the force. In some embodiments, the shielding structure in the equipment is sealed with an air bag ring or an elastic material.

It should be understood, in some embodiments, the described shielding structure is used to shield the fluid on one side of the conveyor belt to obtain a gravity gradient field and a downward direction pressure difference. In some embodiments, the described object is a cassette body. It should be understood, in some embodiments, the described object receives the pressure of the fluid to form upward and downward fluid movement, so that the transmission mechanism is driven to rotate. It should be understood, in some embodiments, the transmission mechanism transmits the fluid kinetic energy to the equipment or the generator. It should be understood, in some embodiments, the annular transmission structure is not affected by the upward fluid pressure because the described shielding structure can offset the pressure of the fluid. It should be understood, in some embodiments, the described object can be a cassette body, which cannot be affected by buoyancy. In some embodiments, the shielding structure can be an object or a rotating device.

In one aspect, a kind of dynamic seal chamber is disclosed, which includes a first shielding structure is fixed to the container, a second shielding structure that is fixed to the container, and the rotating body is dynamically sealed and fixed to the container; one ends of the first and second shielding structures are respectively connected to the rotating body in a hermetically sealed manner, and form a dynamic seal space with the rotating body for accommodating air or a vacuum or a fluid. In some embodiments, the described shielding structure can be provided at any position of the described container. In some embodiments, the dynamic seal can be labyrinth seals and air bag seal. In some embodiments, the shielding structure of equipment can be only one for isolating the liquid.

In one aspect, a sliding rails structure compartment is disclosed, which includes a first ring-shaped sliding rail and a second ring-shaped sliding rail which are correspondingly fixed in parallel to the container, and the two ends of the conveyor belt are respectively connected to the first and second ring-shaped sliding rail for conveying the belt along the slide rail turn. The conveyor belt is arranged on the first and second ring-shaped sliding rails in a hermetically sealed manner. The first and the second ring-shaped sliding rails end faces are closed and the interior of the conveyor belt forms an air space to construct a low pressure or vacuum environment for constructing a gravity/buoyancy gradient field; In some embodiments, the described ring-shaped sliding rails may be polygonal and have at least one hypotenuse. In some embodiments, the described the conveyor belt is connected to the ring-shaped sliding rail via a shaft. In some embodiments, the hydraulic pressure power battery is obliquely fixed inside the container. It should be understood that in some examples, the upper part of the described conveyor belt is subject to fluid gravity (fluid pressure down), the lower part of the described conveyor belt is subject to fluid buoyancy (fluid pressure up). It will be appreciated that in some embodiments the conveyor belt has a shaft and a bearing beneath it, the shaft for supporting the conveyor belt and the bearing rolling along the rails.

In one aspect, a sliding rail sealing device is disclosed, which includes the permanent magnet is located on the sliding rails to form a magnetic ring; the magnetic chamber is situated on the conveyor belt to form a magnetic chamber ring and contains the ferrofluid; the permanent magnet cooperates with the magnetic chamber ring so that the ferrofluid is distributed along the magnetic circuit for dynamic sealing the gap between the two. In some embodiments, the described magnetic chamber can be located on the sliding rail to form a magnetic chamber ring. In some embodiments, the described magnetic chamber can be contained by permanent magnet. In some embodiments, the described permanent magnets can be contained by magnetic chamber rings.

In one aspect, a ferrofluid sealing device is disclosed, which includes magnetic chamber located at one end surface of a structure, the permanent magnet is located at the interior of the rotating body and fixed in position opposite to the magnetic chamber; ferrofluid is within the magnetic chamber and distributed on the surface of the rotating body along the magnetic circuit; and since the permanent magnet is fixed, the ferrofluid does not follow the rotation of the rotating body, the ferrofluid is for fixed and dynamic seal of the gap between the rotating body and the magnetic chamber. In some embodiments, the described interior of the ferrofluid sealing device is a closed space. In some embodiments, the described dynamic sealing chamber may be an internal space of the sealing device.

In one aspect, an apparatus is disclosed for the loss of buoyancy and downward movement of an object, which includes, object 1 located above object 2 and object 2 contains object 1; Object 1 and object 2 are in sealed connections, and the air is below the lower surface of object 1 for shielding the fluid pressure below object 1; and fluid that is distributed on the other surface of the object 1 produces a downward pressure difference on the object 1, the object 1 has no floating kinetic energy, so that object 1 loses buoyant force and moves in the direction of the air.

In one aspect, a method is disclosed for the loss of buoyancy and downward movement of an object, comprising the following steps: locating object 1 above object 2 containing object 1 for shielding fluid; setting the shape of the surface and side surfaces of object 1 in order to make the object 1 not to be affected by the upward pressure of the fluid; setting an air atmosphere below the lower surface of object 1 in order to make object 1 obtaining a downward pressure difference, so that object 1 is not affected by buoyancy and moving in the direction of the air. In some embodiments, the pressure of the lower surface of the object 1 in the described device can be a vacuum or lower than the fluid pressure environment. In some embodiments, the described object 1 and object 2 are in motion. In some embodiments, the connection of the object 1 to the object 2 is a dynamic sealing connection. In some embodiments, the object 2 is connected to the container. In some embodiments, the described object 2 can be a means; it should be understood, in some embodiments, the fluid urges the object 1 to move downward.

In another aspect, a method of manufacturing a hydraulic pressure power battery is disclosed, include the following steps: in a container, 1) the first dynamic sealing chamber is provided below a side of rotating structure, providing a second dynamic sealing chamber above a side of rotating structure; 2) a third dynamic sealing chamber is arranged above the other side of the rotating structure and a fourth dynamic sealing chamber is arranged below the other side of the rotating structure; 3) the first and third dynamic sealing chamber is provided with air; 4) the second and fourth dynamic sealing chamber is equipped with fluid, which is used to apply liquid column pressure and buoyancy to the rotating structure for constructing the gravitational/buoyant gradient field; 5) the pressure inside the second and fourth dynamic sealing chamber is used to produce an exterior torque on the rotating structure in order to promote the rotation of the rotating body; 6) the rotating structure is connected to the output device and transfers the energy obtained by the rotating structure to the generator. In some embodiments, the described container may be sealed. In some embodiments, the described dynamic sealing chamber may be a vacuum state. In some embodiments, the described dynamic sealing chamber is a vacuum, and the described container has gas. In some embodiments, the described dynamic sealing chamber and the described container may be two different liquids or two different gases or different fluid pressure. In some embodiments, the dynamic sealing chamber of the described hydraulic pressure power battery may be one. In some embodiments, the described dynamic sealing chamber may be provided inside the rotating body, or in any position of the circumference.

In another aspect, a method of manufacturing a hydraulic pressure power battery is disclosed, comprising the steps of: 1) setting the rotating mechanism; 2) a dynamic sealing device cooperating with the rotating mechanism is arranged to separate the fluid into a liquid column pressure and upward direction pressure for constructing the gravitational/buoyant gradient field; 3) shielding device is fixed to the container in order to eliminate local buoyancy of rotating mechanism; and 4) using liquid column pressure and buoyancy to produce a rotational torque on the rotating mechanism to promote the rotation of rotating mechanism and output energy.

In another aspect, a method for a hydraulic pressure self-driven rotary power is disclosed: which includes the following steps:
  a) providing a container filled with fluid, a slide rail structure chamber, a conveyor belts and a float;
  b) providing a conveyor belt having a first end or a second end, wherein the first end is for being placed on the container and the second end is for outputting power;

c) providing a floating body which is provided as an object capable of losing buoyancy, which is located on a conveyor belt for constructing of a low-pressure space;

d) providing sliding rail structure chamber, which is placed on the container for constructing the gravitational/buoyant gradient field;

e) fluid movement direction is obtained according to the position of fluid on the floating body: i) the fluid functions on the lower surface of the floating body where the fluid pressure is higher than the pressure of the floating body space so that the floating body is moved, while the lower fluid is moved to the upper position and to push the floating body upwardly; ii) the fluid functions on the upper surface of the floating body where the fluid pressure is higher than the pressure of the floating body space so that the floating body is moved, while the upper fluid is moved to the lower position and to push the floating body downwardly; and f) using the self-driven of the fluid, push the conveyor belt to rotate and output kinetic energy In another aspect, a hydraulic pressure power battery system is disclosed, which includes: 1) a fluid chamber, which is for storing fluid to produce upward and/or downward pressure, wherein the fluid functions on the rotating structure; 2) the gas chamber, which is a storage gas (or vacuum), cooperates with the fluid chamber to change the direction of the fluid pressure; 3) a container, which is provided with fluid chamber, gas chamber, rotating structure and a transmission mechanism in the container; 4) a rotating structure, which is according to the fluid pressure direction, resulting in pressure difference to rotate; 5) and a transmission mechanism, which is for outputting power to the generator based on the kinetic energy supplied from the rotating structure; and 6) a wireless energy transmission device is a device that outputs electric power generated by a generator in the way of wireless transmission. In some embodiments, the described fluid chamber is a reservoir in which the fluid is locally stored. In some embodiments, the described gas chamber is a portion of the container that stores air. In some embodiments, a small amount of fluid in the container or gas chamber will affect the size of the pressure difference; the pump can be added to the excretion or decompression.

In another aspect, a hydraulic pressure power battery equipment is disclosed, which includes: 1) rotating mechanism, which is for receiving fluid pressure, wherein the rotating mechanism comprises a conveyor belt, cassette bodies and transmission means, wherein the cassette bodies and transmission means fixed to the conveyor belt; 2) a sliding rail structure chamber, which is to store gas, inside sliding rail structure chamber may be a vacuum, and the fluid is separated into upper and lower portions, wherein located in the upper part of the conveyor belt receiving fluid gravity, located in the lower part of the conveyor belt receiving fluid buoyancy, so that is constructed; 3) a container, which is provided with fluid, and the slide rail structure chamber, the rotating mechanism and the transmission device are within the container; 4) and a transmission device, which is powered by a conveyor belt in order to output power to the equipment or the generator.

In another aspect, a method of manufacturing a hydraulic pressure power battery, comprising the steps of: providing a rotation mechanism for receiving a fluid pressure, wherein the rotating mechanism includes a conveyor belt, object and transmission device, the object and transmission means fixed to the conveyor belt; according to a sliding rail structure chamber, which is a gas storage (or inside chamber is vacuum), and the fluid is separated into upper and lower portions for changing the direction of fluid pressure to construct the gravitational/buoyant gradient field; wherein located at the upper part of the conveyor belt affected by gravity of fluid, located at the lower part of the conveyor belt affected by buoyancy of fluid; providing a container containing a fluid, a sliding rail structure chamber, a rotating mechanism and a transfer device within the container; and providing a transmission device for deriving power from the conveyor belt to output power to the device or the generator. And a transmission device is powered by a conveyor belt in order to output power to the equipment or the generator. In some embodiments, the described rotating mechanism on the equipment is tilted or at least one inclined edge polygon ring structure. In some embodiments, the described object is cassette body which is convex shape or concave shape.

In another aspect, a hydraulic pressure power battery device is disclosed, which includes: an annular transmission structure, which is used to obtain fluid power through an object, and the obtained power is transferred to the power generation equipment; A shielding device is used to shield the fluid below and the side of the annular transmission structure, so that the side of the annular transmission structure is not subject to upward fluid pressure for constructing the gravitational gradient field; Object, which is for receiving the fluid pressure to get upward and downward fluid power in order to promote transmission mechanism to rotate; and a transmission mechanism for transmitting the fluid kinetic energy obtained by the object to the equipment or the generator. It should be appreciated that in some embodiments, the described annular transmission structure is not subject to upward fluid pressure since the described shielding device offsets the pressure of the fluid.

It should be appreciated that in some embodiments, the described object is not subject to upward fluid pressure due to a gas or vacuum state or liquid-free between the described shielding device and the annular transmission structure, wherein the gas or vacuum state is lower than the fluid pressure.

In another aspect, a method of manufacturing a hydraulic pressure power battery is disclosed, comprising the following steps: providing the annular transmission structure for obtaining the fluid power, and the obtained power is transferred to the power generation equipment; providing shielding device for shielding fluid below and the side of the annular transmission structure, so that the side of the annular transmission structure is not subject to upward fluid pressure; providing objects for receiving fluid pressure to get upward and downward fluid power in order to drive the transmission mechanism to rotate; the transmission mechanism is driven to rotate according to the fluid pressure applied on the upper part or the lower part of the cassette body; the transmission mechanism is driven to rotate because the fluid pressure on upper and lower cassette body; and providing a transmission mechanism, which transfers the fluid kinetic energy obtained by cassette body to the equipment or the generator. In some embodiments, some of cassette bodies on the described equipment are not affected by buoyancy forces. It should be appreciated that in some embodiments, the cassette bodies on the two sides of the described transmission mechanism has a constant buoyancy difference to drive the transmission mechanism to rotate. In some embodiments, the described shielding device may be a steel conveyor belt of the transmission structure. It should be appreciated that in some embodiments, between the described shielding device and the conveyor belt is a dynamic seal, that is, there is no fluid in between or the pressure of the shielded area is lower than the fluid pressure between them.

In another aspect, a hydraulic pressure power battery device is disclosed, which includes: providing fluid chambers and a rotating mechanism, a) providing a fluid chamber on the left side at the upper of the described rotation mechanism, setting a dynamic seal chamber on the right side of the described rotation mechanism and in the opposite direction, setting a dynamic seal chamber below the described rotary mechanism on the left side, setting a fluid chamber on the right side; The fluid chamber and the dynamic seal chamber are respectively distributed from top to bottom on the described rotating mechanism, which are subject to a downward gravitational force of the fluid, the fluid chamber and the dynamic seal chamber are respectively distributed from bottom to top on the described rotating mechanism, which are subject to an upward buoyant force of the fluid, so that a rotating power is formed. Or b) a non-fluid chamber is arranged at the interior of the transmission mechanism, and the transmission mechanism separates the fluid into a upward and downward fluid pressure, according to the pressure distribution in the upper and lower sides of the transmission mechanism, and the rotational power is formed to extract fluid energy.

In another aspect, a hydraulic pressure power battery structure is disclosed, which includes: In an arrangement, including: providing a space structure, the transmission mechanism is divided into one or more sealed chambers by a shielding structure on the surface of the conveyor belt or on both sides of the surface edge of the conveyor belt in the way of dynamic sealing connection, or the internal space of the transmission mechanism is sealed dynamically as a fluid-free chamber to construct a gravitational/buoyant gradient field; and the pressure of gravitational/buoyant gradient field applied on the surface of the transmission mechanism is used to form a rotating torque for extracting the fluid pressure energy.

In some embodiments, the described fluid chamber is disposed on one side of the transport mechanism for constructing an asymmetric buoyancy structure to extract buoyancy energy. In some embodiments, the described shielding structure is provided at the center of lower of the described mechanism for building a fluid chamber and a non-liquid chamber to extract the buoyancy energy.

In some embodiments, the described equipment is a power generating device which includes a magnetic shielding device and a shielding structure. The described magnetic shielding device can extract energy from fluid chamber structure.

A hydraulic pressure self-driven power structure, comprising: a) a container filled with liquid for obtaining a fluid power; b) a rotating mechanism is arranged in the described container for outputting the power of the fluid; and c) asymmetrically mounting the described rotating mechanism and the conveyor belt, or at least a part of the transmission belt is inclined, and the interior of the described rotating mechanism and the transmission belt is provided with air or vacuum; d) enable the interior of the conveyor belt to form a vacuum or air area, forming a fluid region in the exterior of the conveyer belt, the interior of the part of inclined transmission belt is air or vacuum, and the exterior of the part of the inclined transmission belt is fluid; allowing e) (1) an area of upward fluid pressure difference is formed below the rotating mechanism, that is, the buoyancy gradient field; (2) an area of downward fluid pressure difference is formed over the rotating mechanism, that is, gravitational gradient field; f) the described conveyor belt is provided with a certain shape line or objects to increase the force of the conveyor belt and a fluid or gas to push conveyor belt movement, so that g) (i) in the area of the upward fluid pressure difference, the fluid flows from the low position to the high position, pushing the described object upward movement; (ii) in the area of the downward fluid pressure difference, the fluid flows from the high position to the low position, pushing the described object downward movement; h) fluid drives conveyor belt to do circular motion, and output power.

In another aspect, a method of constructing gravitational and buoyant pressure gradient field in fluid is disclosed, including the following steps: setting the top or bottom of an object to be curved or beveled, the object is fixed to a container, which is filled with fluid, the object is immerged into the fluid, the fluid pressure acting on the curved or beveled surface of the object changes in a gradient. In some embodiments, the object may be a rotating mechanism, or a device.

In another aspect, a method of doubling the gravity and buoyancy is disclosed, including the following steps: providing a rotating structure, which is fixed in a container, setting the rotating structure in an air or a vacuum state; then pouring the fluid into the container and the rotating structure immerged into the fluid, so that the fluid pressure on the lower surface of the rotating structure having a pressure difference of the upward direction. It will be appreciated that in some embodiments the surface of the cassette body is subject to a fluid pressure that is related to the magnitude of the internal pressure of the cassette body. That is, the opposite relation. It will be appreciated that, in some embodiments, the size of the pressure difference is related to the internal pressure of the cassette body, that is, the opposite relationship. In some embodiments, the larger the volume of the rotating mechanism submerged in the fluid, the greater the total pressure difference.

In another aspect, a system for directing a direction of pressure difference of a fluid, comprising, a fluid pressure unit, which is for storing a fluid with a relatively large density; a fluid guide unit, which is for storing a fluid with a relatively small density; a container, which is for storing the fluid pressure unit, wherein the fluid pressure unit comprises a fluid guide unit; the fluid of the fluid pressure unit is distributed on the surface of the fluid guide unit and has a function of applying a fluid pressure to the fluid guide unit; the fluid of the fluid guide unit is distributed on the surface of the fluid pressure unit and has a function of directing the direction of the fluid pressure difference of the fluid pressure unit.

In another aspect, a method for directing the direction of pressure difference of a fluid, comprising the following steps: providing a fluid pressure unit, which is for storing a fluid with a relatively large density; providing a fluid guide unit, which is for storing a fluid with a relatively small density; providing a container, which is for storing the fluid pressure unit and the fluid guide unit; obtaining the fluid pressure of the fluid pressure unit by the distribution of the fluid of the fluid pressure unit on the surface of the fluid guide unit; obtaining the direction of the fluid pressure difference of the fluid pressure unit by the distribution of the fluid of the fluid guiding unit on the surface of the fluid pressure unit.

In some embodiments, the fluid guide unit may be a vacuum. It is to be understood that the direction of the fluid pressure difference has relativity, and the positional relationship of the two fluids having different densities can change the direction of the pressure difference. In some embodiments, the fluid pressure difference direction can be changed by a positional relationship between two fluids having different densities, wherein a large density of fluid comprises a small density of fluid, or a small density of fluid being below a large density of fluid. That is, the pressure direction in different directions is obtained at the fluid boundary surface.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

The various embodiments may include any of the above features, individually or in combination.

Other features, objects, and advantages of the present invention will become apparent from the following detailed description.

BRIEF DESCRIPTION OF THE DRAWINGS

FIG. 1A and FIG. 1B are the internal diagram of the shielding structure.

FIG. 4A1 shows the examples of the conveyor device of the equipment, FIG. 4A2 shows a schematic diagram of an example of sliding rails;

FIG. 4C1 shows another schematic of a conveyor belt structure of FIG. 4A1; wherein 4001B as shown;

FIG. 4C2 shows a schematic diagram of sealing structure using ferrofluid; Wherein two upper and lower ferrofluid boxes 4045 arranged on the track of the shielding device 4003, and ferrofluid 4047 filled in it; the magnet ring 4048 arranged on both ends of the transmission belt 4001N corresponds to the ferrofluid box 4046 to attract the ferrofluid 4047 to prevent fluid leakage; 4049 is an elastic sealing ring; 4050 is bearings.

DETAILED DESCRIPTION

Figure 1:
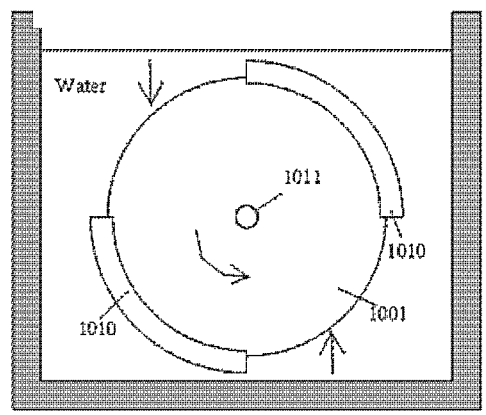
FIG. 1 shows a schematic diagram of a hydraulic pressure power battery programs, FIG. 1A.

FIG. 1 shows a schematic diagram describing one embodiment of the invention in general, wherein the rotating device 1001 is driven by both of gravitational force and buoyancy of water to output kinetic energy (assuming the fluid is water).

With reference to FIG. 1, the first and second shielding device 1010 is connected to the container (not shown). Rotating device 1001 with shaft 1011 is disposed in the container; the first shielding device 1010 is arranged in the center of one side of the rotating device 1001 below, and is dynamically sealed and connected with the rotating device 1001 for shielding the fluid under the rotating device 1001; the second shielding device 1010 is positioned above the other side of the center of the rotating device 1001, and is dynamically sealed and connected with the rotating device 1001 for shielding the fluid above the rotating device 1001.

Figure 1A:
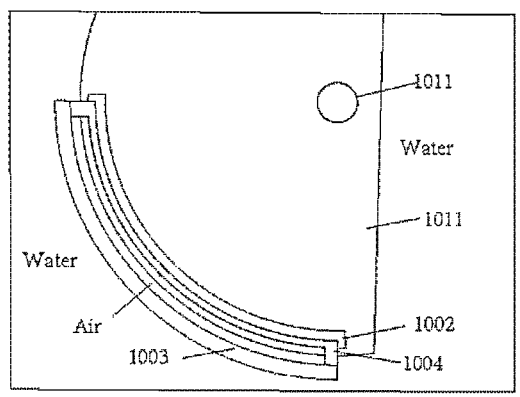

With reference to FIG. 1A, the shielding device 1010 and the shielding rotating device 1001 are shown as features of the exemplary embodiments. The magnet 1002 is arranged at the interior of 1001 and corresponds to a shielding device 1010. Shielding device 1010 includes magnetic chamber 1003 and ferrofluid 1004. The ferrofluid 1004 is arranged at the interior of the magnetic chamber 1003 and attracted by magnetic 1002, ferrofluid 1004 and rotating device 1001 connected axially, seal the gap between magnetic chamber 1003 inside and rotating device 1001, an air chamber is formed by the shielding device 1010 and the rotating device 1001 for shielding the water.

Figure 1B:
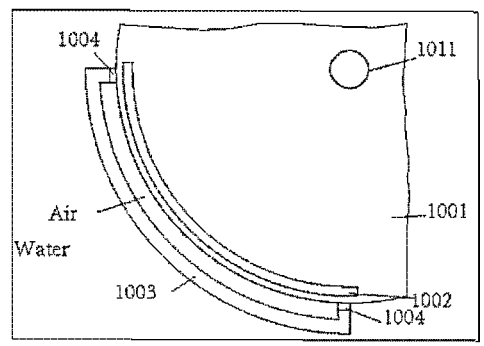
FIG. 1B shows the examples of the shielding device;
Among them, 1001 is the rotating object; 1010 is the shielding object which use to shield the fluid pressure.

With reference to FIG. 1B, the connection between the shielding device 1010 and the shielding rotating device 1001 are shown as another structure schematic diagram. The magnet 1002 is arranged at the interior of 1001 and corresponds to 1010. Shielding device 1010 is composed of magnetic chamber 1003 and ferrofluid 1004. The ferrofluid 1004 is arranged at the interior of the magnetic chamber 1003 and attracted by magnetic 1002, ferrofluid 1004 and rotating device 1001 are connected radially, and seal the gap between magnetic chamber 1003 inside and rotating device

1001; an air chamber is formed by the shielding device 1010 and the rotating device 1001 for shielding the water.

With reference to FIG. 1, when the container is filled with water, the pressure of the air chamber located at the upper and lower of rotating device 1001 is lower than the fluid pressure, namely, water pressure on the left side of the rotating device 1001 has a downward fluid gravitational force, and on the right side of the rotating device 1001 has an upward fluid buoyancy force (as shown by arrows), so that a fluid torque is produced on both side of the rotating device 1001 to promote the rotating device 1001 rotation. Also, per the fluid flow principle, that is, fluid flow from high pressure to low pressure, water pressure on the left side drives the rotating device 1001 to move downward continually, and water pressure on the right-side drives rotating device 1001 to move downward continually, and the kinetic energy obtained by the rotating device 1001 is sent to the transmission shaft 1011 output.

Figure 2:
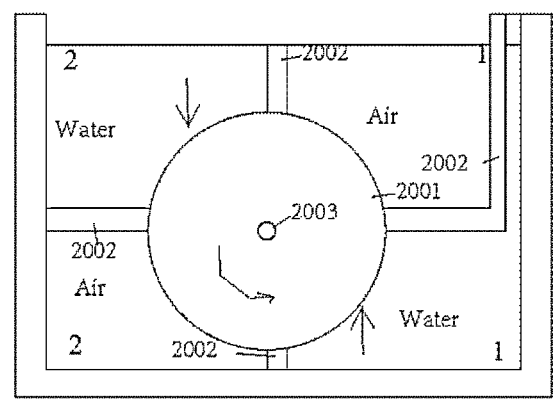
FIG. 2 shows a schematic diagram of a hydraulic pressure power battery scheme.

FIG. 2 shows a schematic diagram of embodiment describing the present invention in general, wherein the cylindrical rotating body 2001 is pushed by both of gravitational force and buoyant force of water to rotate and output kinetic energy (assuming the fluid is water).

With reference to FIG. 2, the first, second, third and fourth shielding structures 2002 are dynamically sealed and contacted with rotating body 2001, respectively. The container 2000 is divided into 4 spaces that constitute the two water chambers and two air chambers. The first water chamber is located below the rotating body 2001, the second water chamber is located on the other side of the upper rotating body 2001; the first air chamber is located above the first fluid chamber, the second air chamber is located below the second fluid chamber. On the left, the second water chamber, the rotating body 2001 and the second air chamber form an area that has a downward direction from strong high-pressure to low pressure and eternal. on the right, the first water chamber, the rotating body 2001 and the first air chamber form a fluid area that has an upward direction from strong high-pressure to low pressure, and eternal (the first water chamber, the rotating body 2001 and the first air chamber form a high-pressure area to low pressure area of fluid).

Figure 2A:
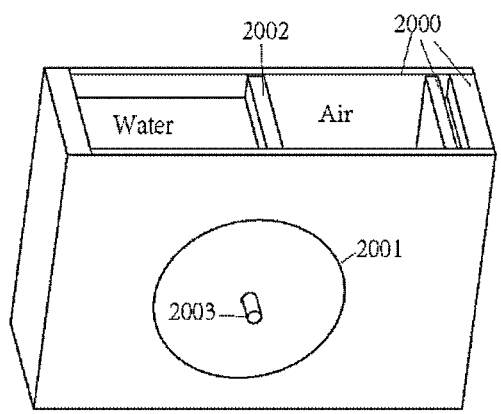
FIG. 2A shows an example of the equipment.

With reference to FIG. 2A, it shows a schematic diagram of example of equipment FIG. 2. Shielding structure 2002 is connected to rotating body 2001 and container 2000. The radial outer edge of rotating body 2001 is dynamically sealed and connected with container 2000, so that the rotating body 2001 is rotated without leakage.

Figure 2B:
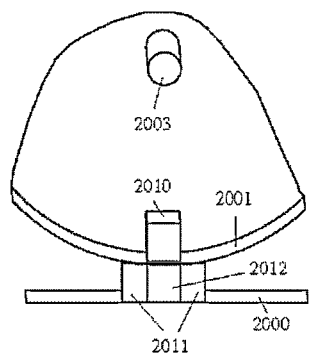
FIG. 2B shows an example of a shielding structure.

With reference to FIG. 2B, the shielding structure 2002 and the rotating body 2001 are shown as features of the exemplary embodiments. The magnetic 2010 is arranged at the interior of the rotating body 2001 and corresponds to the magnetic chamber 2011. The magnetic chamber 2011 is fixed to the container 2000 and filled with ferrofluid 2012. The ferrofluid 2012 is connected to the rotating body 2001 and attracted by magnet 2010, dynamically seal the gap between the shielding structure 2002 and 2001 for isolating fluid.

With reference to FIG. 2, the pressure of the air chamber located at the two side of the rotating body 2001 is less than the fluid pressure, namely, water pressure on the left side of the rotating device 2001 has a downward gravitational force of fluid; and on the right side of the rotating device 2001 has an upward buoyant force of fluid (Shown by arrow), so that a fluid torque is produced on both side of the rotating device 1001 to promote the rotating device 1001 rotation. Also, per the fluid flow principle, that is, fluid flows from high pressure to low pressure, water pressure in the left side drives the rotating device 2001 to move downward continually, and water pressure in the right side drives the rotating device 2001 to move downward continually, and the kinetic energy obtained by the rotating device 2001 is sent to the transmission shaft 2003 output.

Figure 3:
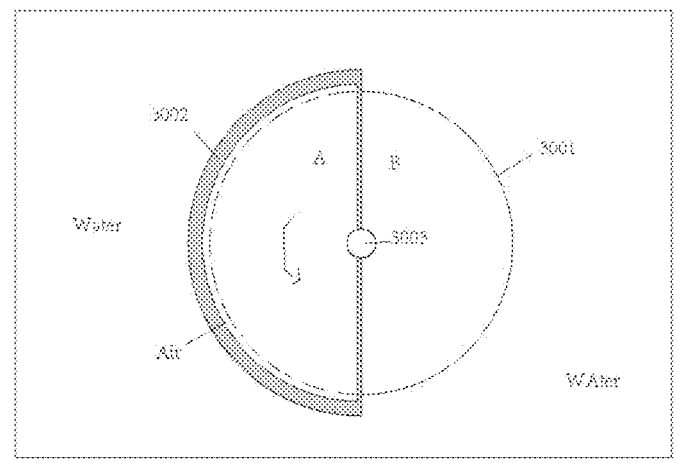
FIG. 3 shows a schematic diagram of a hydraulic pressure power battery programs.
Figure 3A:
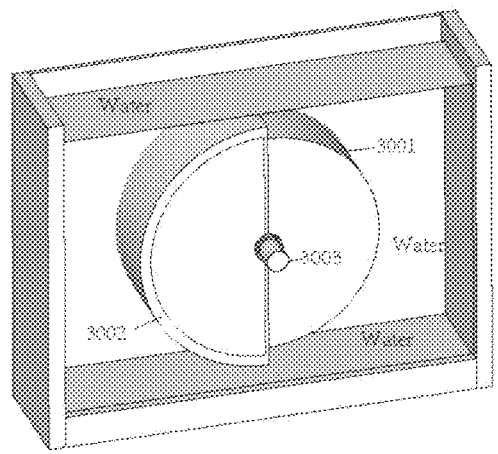
FIG. 3A shows an example of the equipment.

With reference to FIG. 3, it shows a schematic diagram of embodiment that describes the present invention in general. The cylindrical rotating body 3001 is pushed by its gravitational force and buoyant force to rotate and output kinetic energy (assuming the fluid is water).

With reference to FIG. 3, shield cover 3002 located on the left of the center of rotating body 3001 divides the rotating body 3001 into A and B two parts. The shield cover 3002 is dynamically sealed and connected with the rotating body 3001 at the radius of the rotating body 3001, and thus a non-water space is formed at A part, so that the A part of the rotating body 3001 is not affected by the water pressure, and is only affected by downward gravitational force, and the B part of the rotating body 3001 is affected by the buoyancy of water.

Figure 3B:
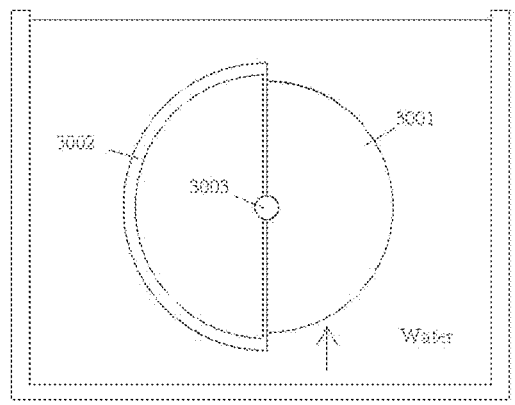
FIG. 3B shows a schematic view of water pressure applied to the rotating body.

With reference to FIG. 3B, it shows the schematic diagram of working principle of equipment FIG. 3. The A part of the rotating body is affected by gravitational force and the B part of the rotating body is affected by buoyant force (shown by the arrow), so that a rotational torque is produced on rotating body 3001 to promote the rotating body 3001 rotation. Because the rotational torque always exists at any moment and push the rotating body 3001 to rotate continually, and the resulting kinetic energy is sent to transmission shaft output With reference to FIG. 4, it shows a schematic diagram of embodiment describing the present invention in general. The transmission belt of the transmission device is 4000, and the object 4001 is driven by the gravitational force and buoyant force of the water to rotate and output the kinetic energy (assuming the fluid is water).

Figure 4:
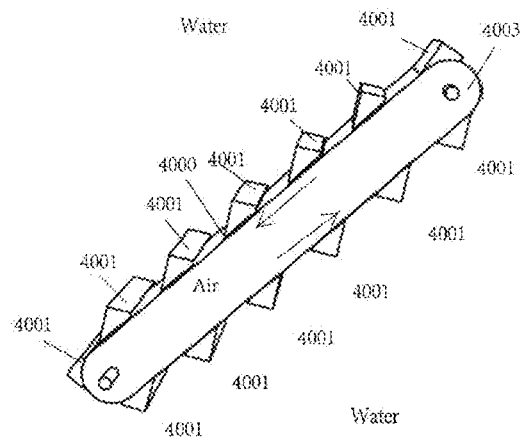
FIG. 4 shows a schematic diagram of a hydraulic pressure power battery programs.

With reference to FIG. 4, it shows a schematic diagram of the structure characteristic of energy extraction equipment. An exemplary embodiment is shown in which an inclined air chamber is formed in the interior of the conveyor belt 4000 to isolate the pressure of the water to obtain a region of low pressure and a gravitational gradient of the fluid. Namely, the fluid flows from strong high-pressure fluid→low pressure fluid: conveyor belt 4000 (upper part)→air chamber-←conveyor belt 4000 (lower part). And the object 4001 is to lose buoyant force.

Figure 4A:
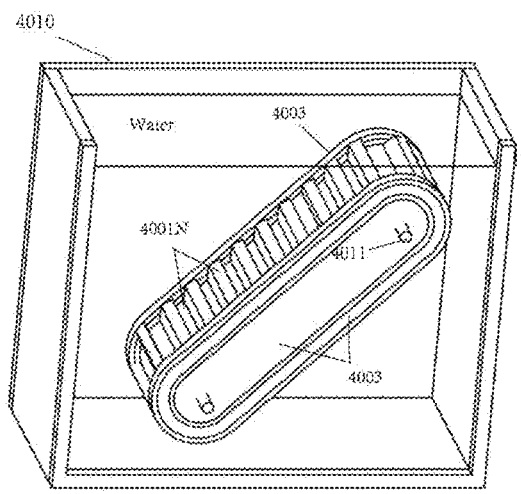
FIG. 4A shows a schematic diagram of an example of a hydraulic pressure power battery.

With reference to FIG. 4A, it shows a schematic example of the structure of energy extraction equipment. Container 4010 is filled with water, the first and second sliding rails 4003 having a rack track groove is aslant fixed to the container 4010 and dynamically sealed and connected with two ends faces of synchronous belt 4001N, respectively, so that an inclined air chamber is formed in the interior of the synchronous belt 4001N to isolate the water pressure.

Figure 4B:
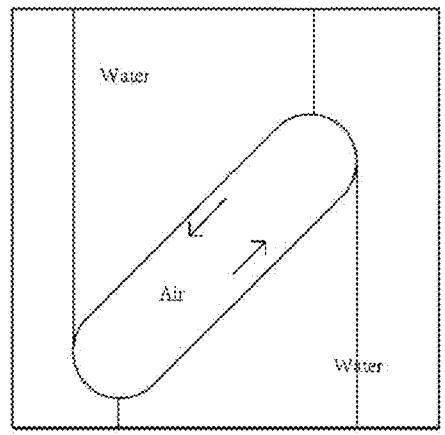
FIG. 4B shows a schematic diagram of the conveyor belt being subject to the water pressure.

With reference to FIG. 4A1 and FIG. 4B, it shows a schematic example of the structure characteristic of synchronous belt 4001N and sliding rail 4003. There are a magnetic chamber ring 4013, a ferrofluid 4004 and an elastic sealing ring 4002 at the two ends of the synchronous belt 4001N, wherein the ferrofluid 4004 and elastic sealing ring 4002 respectively correspond to magnetic ring (not shown) located on sliding rail 4003, and to dynamically seal the gap.

Figure 4C:
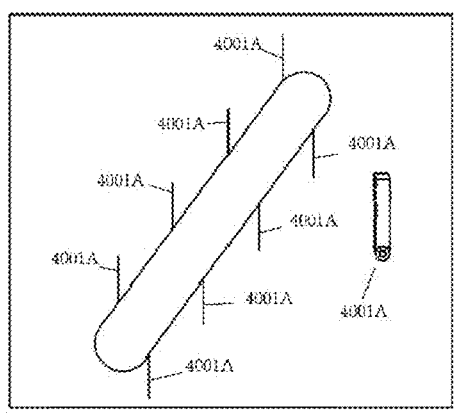
FIG. 4C shows another schematic of a conveyor belt structure of FIG. 4A1; wherein the interior of the conveyor belt is an air chamber for shielding the fluid pressure; a plurality of objects 4001A above the conveyor belt for increasing the thrust of the fluid to the conveyor belt; there is a shaft on one end of the 4001A, and the shaft is fixed to the conveyor belt to enable 4001A to be turned a certain angle, so that the 4001A is not subject to buoyancy at the top of the conveyor and its weighs in water more than the weight in air.

With reference to FIG. 4C, it shows a schematic diagram of the structure characteristic of transmission device. The interior of the conveyor belt is an air chamber for shielding the fluid pressure; a plurality of objects 4001A above the conveyor belt for increasing the thrust of the fluid on the conveyor belt; there is a shaft on one end of the 4001A, and the shaft is fixed to the conveyor belt to enable 4001A to be turned a certain angle; 4001A on upper of the conveyor belt can be rotated a certain angle and then to be vertical, so that the 4001A is not subject to buoyancy and its weighs in water more than the weight in air. When the 4001A at the turning place at the lower end of the conveyor belt is subject to buoyancy, it can be rotated a certain angle, so that it no longer impedes the downward movement of the conveyor belt. When 4001A on lower of the conveyor belt is subject to buoyancy, it is stopped at the vertical angle to increase the thrust of the fluid on the conveyor belt; It should be understood that the angle of rotation of the 4001A is related to the inclination angle of the conveyor belt device.

With reference to FIG. 4C1, it shows another schematic diagram of the structure of transmission device with the air inside. For the 4001B as shown in the figure, the surface of the conveyor belt is semicircular, and the upper part of the conveyor belt is subject to the gravity of the fluid to push the conveyor belt moving downwards; the lower part of the conveyor is subject to the upward pressure of water, that is, buoyancy effect, to promote the conveyor belt moving upward.

Figure 4D:
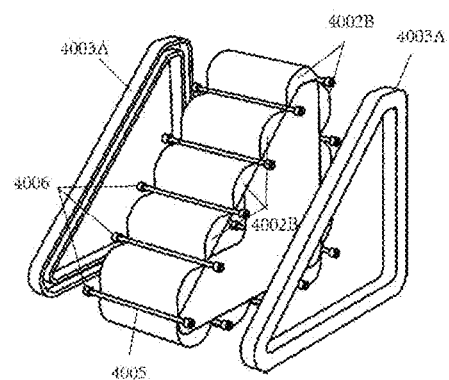
FIG. 4D shows a schematic view of another configuration of hydraulic pressure power battery.

With reference to FIG. 4D, it shows a schematic diagram of embodiment describing the present invention in general, wherein the conveyor belt 4002B is driven by the gravitational force and buoyant force of the water to rotate and output the kinetic energy (assuming the fluid is water).

Figure 4E:
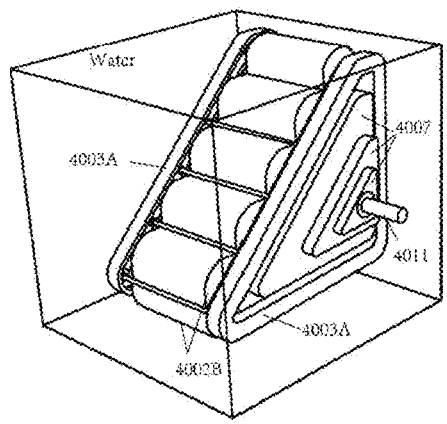
FIG. 4E shows a schematic view of another example of the structure in which two sides of the conveyor belt are connected to the airbag for shielding liquid.

With reference to FIG. 4D, it shows a schematic diagram of the structure of equipment. The first and second sliding rails 4003A is fixed to the container, shafts 4005 fixed to the conveyor belt 4002B. The bearings 4006 mounted on the two ends of the shafts 4005, the bearings 4006 can be configured to roll inside the sliding rail 4003A to drive the conveyor belt 4002B rolling along the sliding rail 4003A.

with reference to FIG. 4E, it shows a schematic diagram of equipment installation. Wherein the multistage annular airbag 4007 is sealed and connected with the conveyor belt 4002B to form an air chamber for shielding the pressure of the water. The multistage annular airbag 4007 fixed to the shaft 4011 to form a traction force to achieve the purposes of the air chamber pressure less than the pressure of water.

Figure 4F:
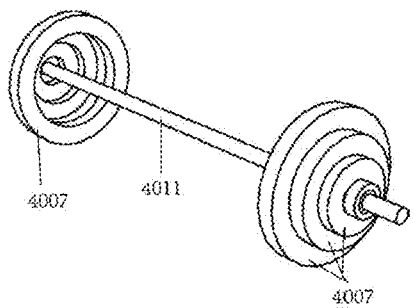
FIG. 4F shows a schematic of the example of an air bag structure.

With reference to FIG. 4F, it shows a schematic diagram of structure characteristic of multistage annular airbag 4007. There is a plurality of annular airbags 4007, and the shaft 4011 is fixed to the container, and can be rotated.

Figure 4G:
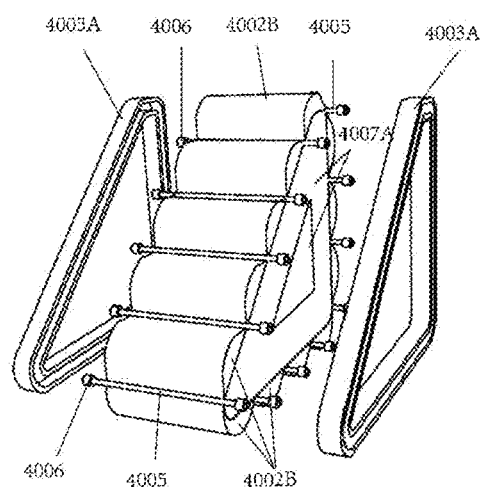
FIG. 4G shows a schematic view of another structure of hydraulic pressure power battery, wherein the two sides of conveyor belt are connected to the elastic material for shielding liquid.

With reference to FIG. 4G, it shows a schematic diagram of structure characteristic of sealing conveyer belt. The airbag 4007A is sealed and connected to the two ends of the conveyor belt 4002B to form an air chamber. It should be appreciated that in some embodiments, the airbag 4007A is a highly elastic material, the pressure should be appropriate to not affect the rotation of the conveyer belt.

Figure 4H:
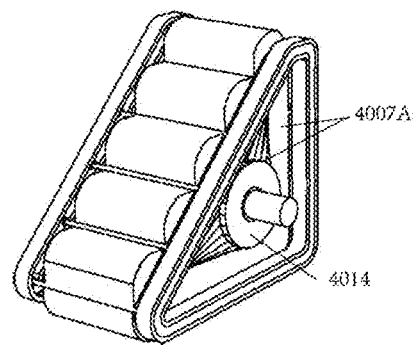
FIG. 4H shows a schematic view of another structure of hydraulic pressure power battery, wherein the elastomeric material is connected to both of conveyor belt and pulleys for shielding liquid.

With reference to FIG. 4H, it shows a schematic diagram of structure characteristic of sealing conveyer belt. The airbag 4007A is sealed and connected to the two ends of the conveyor belt 4002B to form an air chamber. The airbag 4007A is a highly elastic material, fixed to rotating disk 4014 to form a traction, making the air chamber pressure is less than the water pressure, in order not to affect the rotation of the conveyor belt.

Figure 4I:
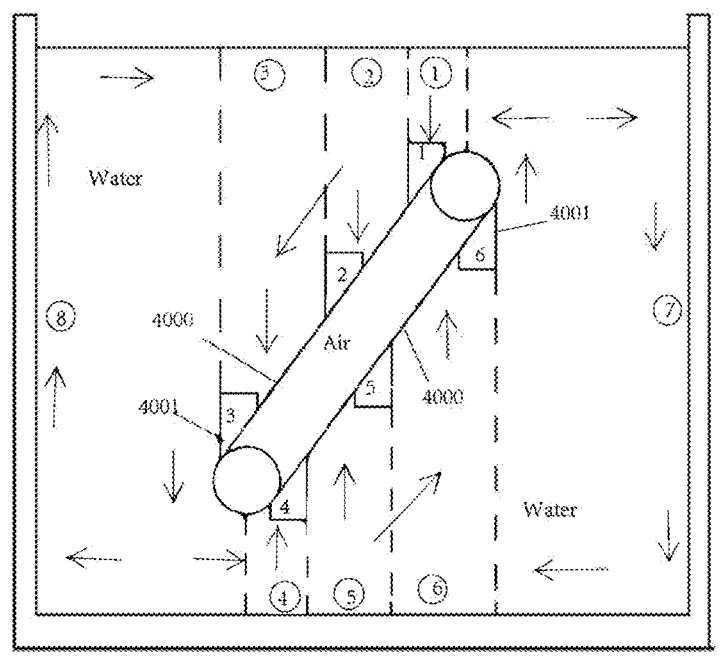
FIG. 4I shows a schematic diagram of the working principle of FIG. 4.

With reference to FIG. 4I, it shows a schematic diagram of the working principle of FIG. 4. The conveyor belt 4000 is inclined to be fixed to the container, and the interior of 4000 is an air chamber; six objects 4001 (assumed to be floating bodies) are fixed to the conveyor belt 4000, and the buoyant force is lost when the objects 4001 is on the left side; in a container filled with water, there are three different pressure regions. That is, conveyor belt 4000(upper part) →air chamber←conveyor belt 4000(lower part)(Arrows show direction of pressure). The pressure of water creates a downward direction of gravity on the upper portion of the conveyor belt 4000, creating a upward direction of buoyant force on the lower portion of the conveyor belt 4000, thus a permanent rotating torque is generated on the conveyor belt 4000. When the device is operating: on the left, 1) below the first, second and third water zone is air, forming gravity gradient field, the gravity of water in these three zones will push the conveyor belt 4000 downward movement, and promoting the first and second objects 4001 to reach the position of the third object 4001; 2) the third object 4001 is rotated to the fourth object 4001 position. That is, water is changed from applying pressure at the top to applying pressure at the bottom, from buoyancy-free to buoyancy; 3) due to the rotation of the conveyor belt 4000, causing the water in the first, second and third zones to move downwards into the lower zone of the 8th zone, resulting in a decrease in water levels in the first, second and third zones. Thus, the water in the high zone of the 8th zone moves to the right, so that the water pressure in the bottom of the 8th zone increases and then moves upwards, thus forming the self-driving rotation of water; on the right side, the water in the first, second and third zones is gradually moved down to the low level of the eighth zone due to the rotation of the conveyor belt 4000, resulting in a decrease in the water levels of the first, second and third zones; 4) Air is above the fourth, fifth, and sixth water zones, water in these three zones enable the fourth, fifth and sixth objects 4001 and conveyor belt 4000 to have an upward direction of the pressure difference, thus forming a buoyant gradient field, these three zones of the water will push them to move upward, and promoting the fourth and five objects 4001 to reach the position of the sixth object 4001; 5) meanwhile, the sixth object 4001 is at the bottom to applying pressure at the top, from buoyancy to buoyancy-free; 6) due to the movement of the conveyor belt 4000, causing the water in the fourth, fifth and sixth zones to move upwards into the high zone of the 7th zone, resulting in a decrease in water pressure levels in the fourth, fifth and sixth zones and an increase in water pressure in the low zone of the 7th zone. Therefore, the water in the low zone of the 7th zone moves to the left, so that the water in the 7th zone moves downwards, thus forming the self-driving rotation of water; 7) the first, second, and third objects 4001 and fourth, fifth, and sixth objects 4001 cyclically rotate upward and downward by the rotation of water, and the conveyor belt 4000 outputs the generated kinetic energy by cyclic movement. 7) Through the rotation of the water, an upward and downward movement of the cycle is generated between the first, second and third objects of 4001 and the fourth, five and six of 4001. By the cyclic movement, the conveyor belt 4000 outputs the generated kinetic energy.

Figure 5:
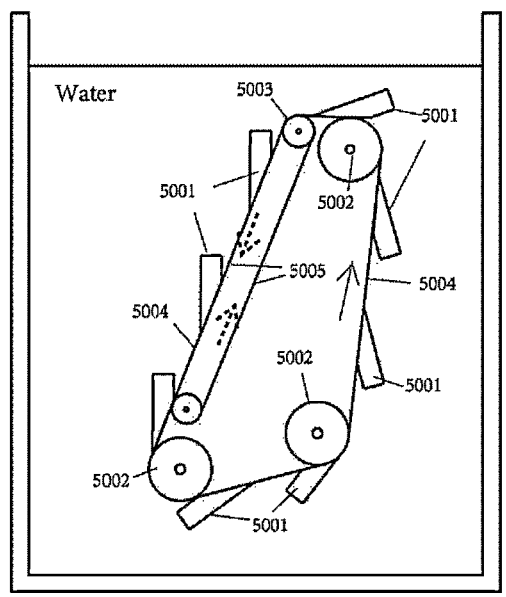
FIG. 5 shows a schematic diagram of an example of hydraulic pressure power battery.

With reference to FIG. 5, it shows a schematic diagram of embodiment describing the present invention in general, wherein the object 5001 is driven by the gravitational force and buoyant force of the water to rotate and output the kinetic energy (assuming the fluid is water).

With reference to FIG. 5, it is applicable to larger surface environments. A pulley 5002 and a pulley 5003 are fixed to the container respectively, the conveyor belt 5004 is provided with eight objects 5001 and 5004 is arranged on three sets of pulleys 5002; the rotating belt 5005 is disposed on the pulleys 5002 and 5003, and the rotating belt 5005 is in close contact with the conveyor belt 5004 located on the left side for shielding the water pressure of the left side of the conveyor belt 5004. It is to be understood that the object 5001 is positioned above the rotating belt 5005, the shape of 5001 not affected by buoyancy and it is related to the inclination angle of the conveyor belt. The described rotating belt 5005 is the steel material.

Figure 5A:
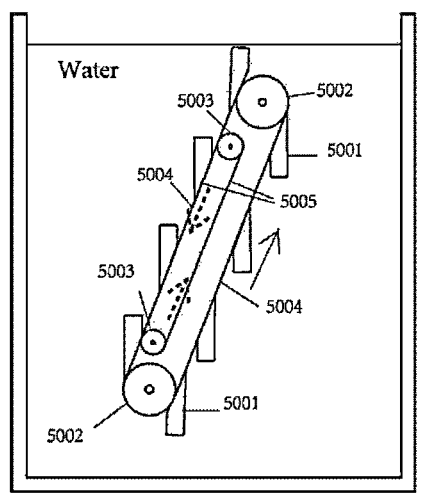
FIG. 5A shows another structure of the equipment.

With reference to FIG. 5A, another structural feature of the equipment FIG. 5 is shown. The rotating belt 5005 is arranged on two sets of small pulleys 5003. The conveyor belt 5004 is disposed on two sets of pulleys 5002 and eight objects 5001 are mounted to the conveyor belt 5004. As shown in the figure, the rotating belt 5005 is in close contact with the left side of the belt 5004 to shield the conveyor belt 5004 from being subject to upward water pressure.

With reference to FIG. 5, it shows a schematic diagram of the working principle of equipment. The object 5001 is assumed to be less dense than water. When the equipment is operating: 1) the water pressure below the objects 5001 located on the left side of the conveyor belt are shielded by 5005, the objects 5001 has no upward motive force, while the gravity of water is applied to the top of the left side of the 5001, where water forms a high pressure→low pressure region, that is, the gravitational gradient field is formed, so that the water will push the left side of object 5001 downwardly along the rotating belt 5003; 2) the objects 5001 located at the bottom of the right side of the conveyor belt is subject to buoyancy of water to form a high pressure→low pressure region in the vertical direction, that is, the buoyant gradient field is formed, thus the water will move upward to push the right side of the conveyor belt of objects 5001 upward movement; 3) the objects located on left and right sides of the conveyor belt 5001 carry the conveyor belt 5004 and the rotating belt 5005 to rotate, and the rotation of the rotating belt 5005 continues to shield the upward pressure of the water; 4) due to the rotation of objects 5001, the objects 5001 on the left side of the conveyor belt moves to the right, the bottom of the objects 5001 begin to be buoyed by the water, thereby turning upwards; and 5) due to the rotation of objects 5001, the objects 5001 on the right side of the conveyor belt moves to the left, the top the objects 5001 begin to be affected by the gravity of water, thereby turning downwards, that is, the conveyor belt 5004 will circulate and output the generated kinetic energy.

Figure 6:
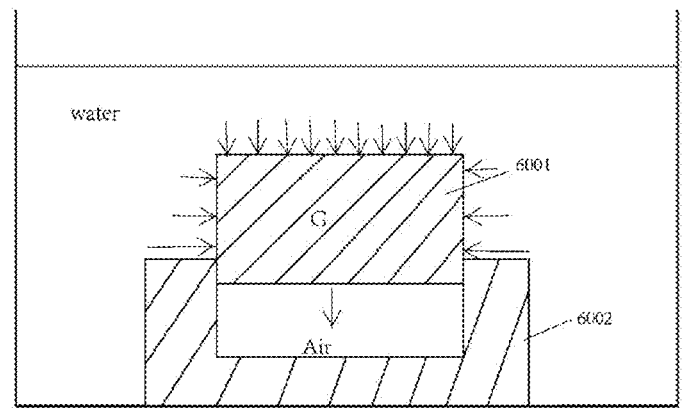
FIG. 6 shows a schematic view of a method of object losing buoyancy.

With reference to FIG. 6, it shows an exemplary schematic diagram of describing the method that the floats lose buoyancy and move downwardly in the present invention, wherein the floats are less than the density of the fluid, the cube 6001 is a float, which is moving downward under the effect of gravity of water (assuming the fluid is water).

With reference to FIG. 6, it shows the structural features of applying the method that the floats lose buoyancy and move downwardly, and the float 6001 is positioned above the object 6002, and the object 6002 is fixed to the container; the float 6001 is the object 6002, the periphery of the float 6001 is dynamically sealed and connected with the object 6002 and can be sliding up and down, and an air chamber is formed at the bottom of the float 6001. When the container is filled with water, the water exerts pressure on the top and surrounding surface of the float 6001 (indicated by the arrows), the water has a horizontal pressure only on the surrounding surface of the float 6001 and is canceled by the symmetry of the surrounding surface of the float 6001; a downward pressure zone is formed above the float 6001 (water→air chamber). That is, there is no upward power under the float 6001, the float 6001 lost buoyant force. Water applies gravitational force above the float 6001, forming a downward power to move the float 6001 downwardly, while the gravity of float 6001 is increased, that is, the gravity of the float 6001=the weight of the object+the gravity of the water.

Figure 6A:
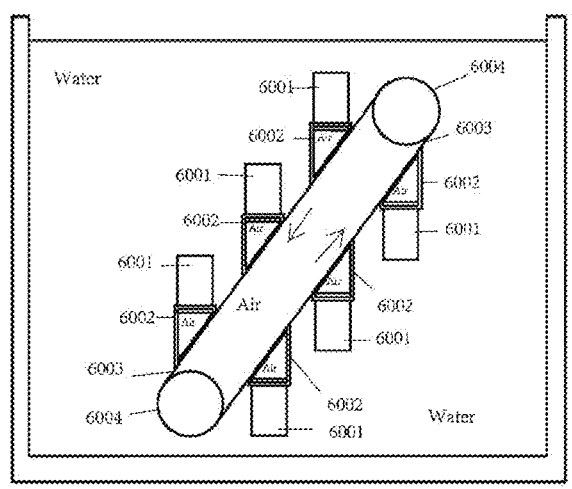
FIG. 6A shows a schematic diagram of hydraulic pressure power battery manufactured by applying the method of object losing buoyancy.

With reference to FIG. 6A, it shows an exemplary schematic diagram of describing the application of a method that the float loses buoyant force and moves downward in general in present invention, in which an equipment has applied the method, wherein the float 6001 is driven up and down repeatedly by the gravity and buoyancy of the water for outputting the kinetic energy (assuming the fluid is water). A float 6001 is fixed to the air cassette 6002, the air cassette 6002 is connected to the conveyor belt 6003, the conveyor belt 6003 is rotatable on the wheel 6004, the first and second wheels 6004 are obliquely fixed to the container, its inclined angle is such that the surrounding surfaces of the floats 6001 and air cassette 6002 are not subject to upward movement of water without upward motive power. The conveyor belt 6003 is connected to the first and second wheels 6004 to form an air chamber so that the float 6001 of the left side of the conveyor belt is air, that is, on the left side of the conveyor belt 6003, a water gravitational gradient field is formed, which acts as a downward movement of the float; While the air is above the air chamber 6002 of the right side of the conveyor belt, that is, on the right side of the conveyor belt 6003, a buoyant gradient field is formed. When the equipment is operating: 1) on the left side of the equipment, the float 6001, the air cassette 6002 and the conveyor belt 6003 will begin to rotate under the effect of gravity of water, the water will move downward along the conveyor belt 6003. That is, the high water will move to the lower position along the conveyor belt 6003; 2) on the right side of the equipment, the float 6001, the air cassette 6002 and the conveyor belt 6003 will begin to rotate under the effect of buoyancy of water, the water will move upward along the conveyor belt 6003. That is, the low water will move to the higher position along the conveyor belt 6003; 3) thus, the conveyor belt 6003 starts a rotational movement; 4) because of rotation, the objects 6001 on the right side rotate to the left one by one, and the left side of cubes 6001 rotate to the right side one by one, returning to the initial state, completing a reciprocating cycle; thereafter, the objects 6001 continue to move, urging the conveyor belt 6003 to continue moving to output the obtained kinetic energy. It should be understood, the selection of materials such as floats, transmission device, containers, etc., should consider the corrosive effects of the fluid on them, and the shape of the floats 6001 may be streamlined to reduce drag at low rotation.

Figure 7:
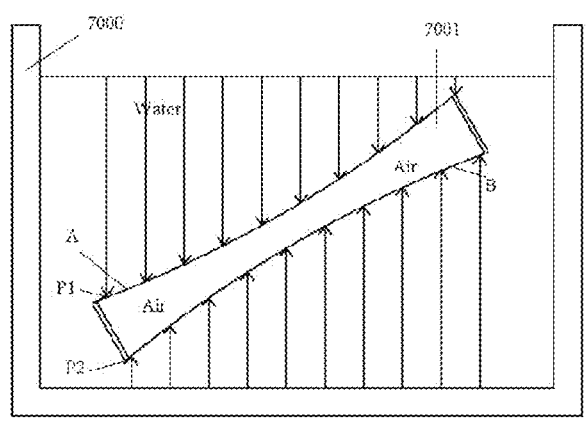
FIG. 7 shows a schematic of the fluid gradient field.

With reference to FIG. 7, it shows exemplary schematic of a method of constructing a fluid gravity gradient field and a buoyancy gradient field in a static fluid (assuming the fluid is water), including the cassette body 7001 fixed to the container 7000 obliquely in an certain angle for receiving the gravity of the fluid on the upper surface of the cassette body 7001 and receiving the buoyancy on the lower surface. It will be appreciated that the cassette body 7001 can be any object.

With reference to FIG. 7, it shows that the inside of the cassette body 7001 is air, the surface of A and B is the elastic membrane, above the surface of A, there is a gravitational gradient field of fluid, below the surface of B, there is a buoyant gradient field. In the water, the downward direction arrow is the gravitational gradient field, the upward direction arrow is the buoyant gradient field, their direction is opposite, and the intensity of the field is maximum at P1 and P2. It will be appreciated that the float fixed to the surface of A will be converted to a sinker.

Whenever and wherever, the gravitational field stores energy in the form of pressure and in the way of wireless transmission within the gravitational field, so that the fluid becomes "energy storage", which is a long-lasting capacity battery and an unparalleled battery.

The above-mentioned embodiments demonstrate the following concepts:

1. an energy conversion device for converting fluid pressure energy into mechanical energy in a fluid, the stated energy conversion device is a device that use the hydrostatic pressure to drive the generator. The stated energy conversion device comprises at least one shielding structure and a transmission mechanism and a fluid, characterized in that, the shielding structure shields the fluid pressure applied on a portion of the stated transmission mechanism; a transmission mechanism in which a portion of the transmission mechanism is configured as a region of a different pressure to direct the fluid from the high-pressure region to the low-pressure region to push the stated transmission mechanism.

2. A hydraulic pressure battery, comprises a fluid, a shielding structure, a transmission mechanism and a power generating device. The transmission upper surface or the lower surface of the transmission mechanism is arranged as a sealed space to guide the fluid itself to drive transmission mechanism for outputting the pressure energy in a pressure difference manner. The internal pressure characteristics of the stated sealed space being lower or higher than the fluid pressure characteristics, wherein the pressure difference is achieved by a difference between the fluid pressure acting on the surface of the stated transmission mechanism and the internal ambient pressure of the stated sealed space. Wherein, the fluid self-driving is achieved by the flow of the fluid from the high-pressure region to the low-pressure region. A shielding structure, the stated hydraulic pressure battery also comprises one or more of the shielding structures for forming a sealed space in combination with the stated transmission mechanism to contain a gas, a fluid or a vacuum, the stated fluid comprising liquid and gas.

3. A hydraulic pressure power battery, comprises a fluid, a shielding structure, a transmission mechanism, removing fluid device and a power generating device. A transmission mechanism, wherein the surface of the transmission mechanism is configured as the bottom surface or the top surface of the fluid pressure gradient field to guide the fluid itself to drive transmission mechanism for outputting the pressure energy in a pressure difference manner. The fluid bottom or top surface of the stated fluid pressure gradient field is characterized by a bevel or curved surface, wherein the pressure difference is achieved by a difference between the pressure gradient field and a gas or a vacuum or a low pressure spatial pressure. A shielding structure, the stated hydraulic pressure battery also comprises one or more of the shielding structures for isolating the pressure of the fluid against the stated rotating structure to obtain a downward direction of pressure difference.

4. A portion of the stated transmission mechanism is shielded by the stated shielding structure.

5. A portion of the surface of the transmission mechanism is configured as one or more of the stated sealed spaces.

6. The stated transmission mechanism is dynamically sealed and connected with the stated sealing space.

7. The shielding structure is fixed.

8. A system for directing a direction of pressure difference of a fluid, comprises, a fluid pressure unit, which is for storing a fluid with a relatively large density; A fluid guide unit, which is for storing a fluid with a relatively small density; A container, which is for storing the fluid pressure unit, wherein the fluid pressure unit comprises a fluid guide unit; The fluid of the fluid pressure unit being distributed on the surface of the fluid guide unit and having a function of applying a fluid pressure to the fluid guide unit; The fluid of the fluid guide unit being distributed on the surface of the fluid pressure unit and having a function of directing the direction of the fluid pressure difference of the fluid pressure unit.

9. A method for directing the direction of pressure difference of a fluid, comprises the following steps: providing a fluid pressure unit, which is for storing a fluid with a relatively large density; providing a fluid guide unit, which is for storing a fluid with a relatively small density; providing a container, which is for storing the fluid pressure unit and the fluid guide unit; obtaining the fluid pressure of the fluid pressure unit by the distribution of the fluid of the fluid pressure unit on the surface of the fluid guide unit; Obtaining the direction of the fluid pressure difference of the fluid pressure unit by the distribution of the fluid of the fluid pressure guiding unit on the surface of the fluid pressure unit. It will be appreciated that in some embodiments, the stated energy conversion device or the hydraulic pressure power battery provides power or electricity for the mobile device. The stated energy conversion device or the hydraulic pressure power battery can be provided on the gyro device so that the each of the working units in the stated energy conversion device or the hydraulic pressure power battery can always be maintained in the working state or kept perpendicular to the center of the earth. Wherein the working units in the stated energy conversion device or the hydraulic pressure power battery comprises a pressure unit, a fluid guide unit, a gravitational gradient field and a buoyant gradient field. It should be appreciated that in some embodiments, the material for shielding the fluid may be an aerogel material.

The above-mentioned embodiments also demonstrate the following concepts:

1. A fluid gravity/buoyancy gradient field apparatus, comprising: setting up a fluid unit, a low-density fluid space in a gradient form; fluid gravity gradient field apparatus: configuring a low-density fluid space in a gradient form below/side of said fluid unit; determining for fluid gravity as a form of gradient liquid-column pressure acting on said low-density fluid space based upon fluid gravity and the form of the top/side of said low-density fluid space; determining for said low-density fluid space to obtain a fluid-gravity gradient field based upon a form of fluid-gradient liquid-column pressure; buoyancy gradient field apparatus: configuring a low-density fluid space in a gradient form above/side of said fluid unit; determining for buoyancy as a form of buoyancy gradient acting on said low-density fluid space based upon buoyancy and the form of the side/bottom of said low-density fluid space; determining for said low-density fluid space to obtain the buoyancy gradient field based upon a form of buoyancy of fluid.

2. A hydraulic power battery, which is a power generation apparatus driven by fluid pressure to therefore continuously produce the kinetic energy, comprises: mounting a transmission mechanism on a stand within fluid, the transmission mechanism is connected to a generator; configuring a low-density fluid space at a desired location of the transmission mechanism to sense fluid power and obtain a fluid gradient field; determining the fluid gravitational potential/fluid buoyant potential energy obtained by the transmission mechanism based upon the location of the low-density fluid space configured at the transmission mechanism; the fluid gravitational potential energy is obtained by the fluid-column pressure acting above the transmission mechanism; the fluid buoyant potential energy is obtained by fluid buoyancy located below the transmission mechanism; determining a torque of fluid based on the transmission shaft, in response to the sensed fluid potential energy, and coupling the collective fluid gradient field with the collective gravity of transmission to obtain a fluid torque for driving the transmission mechanism; determining the rotational motion of the transmission mechanism to therefore drive a generator within fluid based upon the continuous-existing fluid-gravity gradient field/buoyancy gradient field.

3. Fluid-gravity gradient field and buoyancy gradient field are obtained by setting a low-density fluid space inside of transmission mechanism; the downward direction of the fluid pressure is a fluid-gravity gradient field; the upward direction of the fluid pressure is a buoyancy gradient field.

4. Rolling shafts are mounted on the transmission mechanism; at least one of slide rail is mounted on the stand.

5. Objects are mounted on the transmission mechanism for withstanding the fluid.

6. The fluid-gravity gradient field and the buoyancy gradient field are obtained by a low-density fluid space configured at a desired location external to the transmission.

7. Rolling shafts are mounted on the transmission belt for withstanding the acting of fluid.

8. A hydraulic pressure power battery, comprises: transmission mechanism: a plurality of objects are mounted on the transmission belt, each rolling shaft mounted above each object; at least two rotating shafts are mounted on the stand at an oblique angle to the horizontal plane; mounted on the stand, and the transmission belt is mounted on the two rotating shafts at an oblique angle to the horizontal plane; the transmission belt is mounted on the rotating disc, and the rotating disc is mounted on the rotating shaft; the sliding rail is installed on the stand and all the rollers are mounted on the sliding rail; the transmission belt is movable along the sliding rail based on the rotating shaft; the transmission mechanism is drivingly coupled to an electrical generator; the interior of the transmission belt is configured as a low-density fluid space: the objects in the region above the low-density fluid space is configured to obtain a gravity of the fluid in response to the sensed fluid-gravity gradient field; the objects in the region below the low density fluid space configured to obtain buoyancy in response to the sensed buoyant gradient field;

determining a torque of fluid based on the transmission shaft, in response to the sensed fluid pressure direction, and coupling the collective fluid gradient field with the collective gravity of transmission to obtain a fluid torque for driving the transmission mechanism;

determining the rotational motion of the transmission mechanism to therefore drive a generator within fluid based upon the continuous-existing fluid-gravity gradient field/buoyancy gradient field;

determining the asymmetry of the collective gravity of total objects on the transmission belt based upon the transmission shaft, in response to the sensed fluid pressure direction;

determine the fluid torque based upon the transmission shaft, and coupling the collective pressure of fluid with the collective gravity of total objects on the transmission belt to obtain a torque for driving the transmission mechanism to turn; and determining the continuous-rotating motion of the transmission mechanism based upon the continuous-existing fluid-gravity gradient field/buoyancy gradient field.

In conclusion, several embodiments of a gravitational/buoyant gradient field-based scheme for extracting fluid energy have been described. It is known that "Crystal radio" is a radio without a power "sound source". The hydraulic pressure power battery is just like the "Crystal radio", which is no need to recharge—"energy source", it can be anywhere in the world to provide long-lasting power to any and every individual (public).

For example, in the macroscopic world, such the scheme of energy source may be used to power a home, a robot in a plant, and/or a computer, or to power an electric vehicle. For example, some embodiments may provide power to an implanted medical device, such as an artificial heart, a pacemaker, a drug delivery pump, or a buried sensor.

Several embodiments of the present invention have been described. It should be understood, however, that various modifications may be made without departing from the spirit and scope of the invention.

The foregoing description relates to what is presently considered to be the most practical embodiments. It is to be understood, however, that the present disclosure is not limited to these embodiments, but, on the contrary, is intended to cover various modifications and equivalent arrangements included within the spirit and scope of the appended claims, which is within the broadest interpretation, as permitted by law to include all such modifications and equivalent structures.

I claim:

1. A method for converting fluid pressure energy into mechanical energy, comprising:

filling a container with water;

providing a first inclined sliding rail with a racetrack groove and a second inclined sliding rail with a racetrack groove, parallel to and opposite the first rail;

providing a transmission device comprising a conveyor belt, at least one first object attached to and located above the conveyor belt, and at least one second object attached to and located below the conveyor belt;

attaching a plurality of shafts to the conveyor belt, with each shaft having one bearing on each end disposed into one of the racetrack grooves such that the transmission device rotates along the first and second inclined sliding rails;

dynamically sealing and connecting the first and second sliding rails to two end faces of the conveyor belt to form an inclined air chamber within the conveyor belt to isolate the water pressure;

attaching an energy output shaft to and rotating with the conveyor belt, with each end of the shaft having an airbag that is sealed and connected to one end of the conveyor belt to form a part of the air chamber for shielding the water pressure;

shielding the water pressure on the at least one first object from the bottom with the upper part of the conveyor belt such that the first object is movable in a downward direction, and shielding the water pressure on the at least one second object from the top with the lower part of the conveyor belt such that the second object is movable in an upward direction, thereby causing the first and second objects to rotate along the first and second inclined sliding rails and outputting energy through the energy output shaft; and the interior of the transmission belt is configured as a low-density fluid space: the at least one object above the conveyor belt is configured to obtain a gravity of the fluid in response to the sensed fluid-gravity gradient field; the at least one object below the conveyor belt is configured to obtain buoyancy in response to the sensed buoyant gradient field.

* * * * *